M. & G. SIZAIRE.
STEERING GEAR.
APPLICATION FILED MAY 26, 1914.

1,120,096.

Patented Dec. 8, 1914.

Witnesses:
Grattan Purcell
Wm. H. Bates

Inventors
Maurice Sizaire, and
Georges Sizaire
by Herbert W. Jenner.
Attorney.

UNITED STATES PATENT OFFICE.

MAURICE SIZAIRE AND GEORGES SIZAIRE, OF PARIS, FRANCE.

STEERING-GEAR.

1,120,096.  Specification of Letters Patent.  Patented Dec. 8, 1914.

Application filed May 26, 1914. Serial No. 841,024.

*To all whom it may concern:*

Be it known that we, MAURICE SIZAIRE and GEORGES SIZAIRE, residing at 67 Rue des Entreprenures, Paris, France, and 9 Rue Clodion, Paris, France, respectively, have invented certain new and useful Improvements in Steering-Gear; and we do hereby declare the following to be a full, clear, and exact description of the invention, such as will enable others skilled in the art to which it appertains to make and use the same.

This invention relates to a means of actuating the steering gear of motor vehicles designed with a view to reduce to a minimum the friction and consequently the wear of the parts and to compensate automatically any play arising in the steering gear box and thus make the vehicle easier to drive.

The arrangement comprises a worm coöperating with the steering-wheel-shaft in the thread whereof engages a conical roller fitted on an arm coöperant with a shaft on which is keyed the steering lever connected to the steering wheels in the usual manner by means of levers and connecting rods.

The invention is carried out as follows reference being made to the accompanying drawings in which:—

Figure 2:
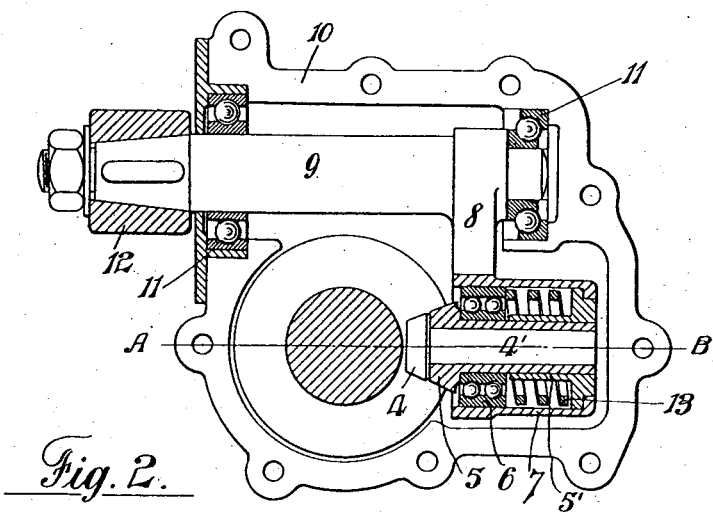
Figure 1:
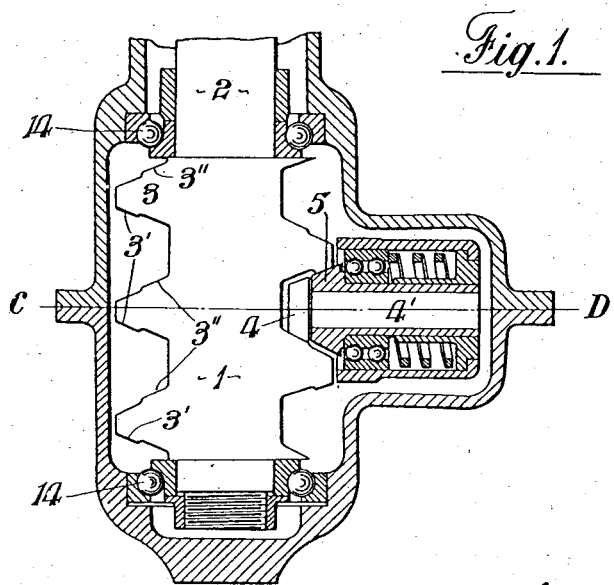

Figure 1 is a sectional view through the center line of the steering worm on the line A—B of Fig. 2. Fig. 2 is a section transversely to the worm through the line C—D of Fig. 1.

The worm shown at 1 is coöperant with the steering-wheel-shaft 2. This worm is made with a large thread of suitable pitch; this thread shown as a whole at 3 presents two working helicoidal surfaces, one 3″ belonging to the lower face of the thread and the other 3′ belonging to the upper face of the thread extending over only part of the width of the thread, one on the inside the other on the outside. Twin rollers 4 and 5 engage helicoidal surfaces 3″ and 3′ respectively, so that for each roller, contact occurs only at the working point at a single end of the diameter, no contact or friction occurring at the other end. This arrangement makes it possible to place and maintain two conical rollers in true contact free from play or detrimental frictional resistances with the two separate helicoidal surfaces. The roller 5 is fitted by means of the ball bearing 6 in the box 7 formed in the lever 8 which latter is coöperant with the shaft 9 carried in the steering box 10 by two roller bearings 11; on this shaft 9 is keyed the lever 12 actuating the wheels by means of the usual bars and levers. The roller 5 with its sleeve 5′ provides a bearing for the spindle 4′ of the roller 4.

A spring 13 housed in the box 7 insures, by its pressure on the external sleeve of the ball bearing 6 a true contact between the rollers and the two helicoidal surfaces of the worm thread, the internal sleeve of the ball bearing thrusting against the shoulder of the roller 5, the extremity of which bears against the shoulder of the roller 4. The worm is centered in the roller box by means of ball bearings 14, Fig. 1. This arrangement removes all detrimental frictional resistances affecting the transmission between worm and rollers constituting thus a steering-gear which is strong, very smooth running and free from play.

As already explained, each of the rollers touches the corresponding helicoidal surface at a single end of its diameter, the opposite end being always and permanently out of contact with the worm, and the two rollers engage their helicoidal surfaces in opposite directions. A very smooth and regular transmission from worm to roller is thus obtained, while the use of roller-bearings for all parts except the small roller 4 increases to the utmost the smoothness of motion, which owing to the above mode of operation, is very marked thus making the vehicle very easy and responsive to manual control.

We claim:

1. The combination, with a revoluble worm provided with an inner working face on one side of its thread and an outer working face on the other side of its thread at a greater distance from its axis than the inner working face, of a pivoted lever provided with a bearing at its free end portion, a roller which bears against the said outer working face and which has a sleeve which is journaled in the said bearing, and a second roller which bears against the said inner working face and which has a spindle which is journaled in the said sleeve.

2. The combination, with a revoluble worm provided with an inner working face on one side of its thread and an outer working face on the other side of its thread at a greater distance from its axis than the inner working face, of a pivoted lever provided with a bearing at its free end portion, a roller which bears against the said outer working face and which has a sleeve which is journaled in the said bearing, a second roller which bears against the said inner working face and which has a spindle which is journaled in the said sleeve, and a spring which presses both of the rollers toward the axis of the worm.

3. The combination, with a revoluble worm provided with an inner working face on one side of its thread and an outer working face on the other side of its thread at a greater distance from its axis than the inner working face, of a pivoted lever, separate rollers which bear against the inner and outer working faces respectively, said rollers being journaled concentric with each other and supported by the free end portion of the said lever.

In testimony whereof we affix our signatures, in presence of two witnesses.

MAURICE SIZAIRE.
GEORGES SIZAIRE.

Witnesses:
FERD MUND,
FERD BUTTIGEE.